(12) United States Patent
Keller et al.

(10) Patent No.: US 6,362,289 B1
(45) Date of Patent: Mar. 26, 2002

(54) HIGH TEMPERATURE ELASTOMERS FROM LINEAR POLY(SILARYLENE-SILOXANE-ACETYLENE)

(75) Inventors: Teddy M. Keller, Fairfax Station; Craig Homrighausen, Lorton, both of VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/625,271

(22) Filed: Jul. 25, 2000

(51) Int. Cl.$^7$ .......................... C08L 83/08; C08L 83/14
(52) U.S. Cl. .......................... 525/477; 528/43; 528/34; 528/32; 528/38; 528/35; 585/416; 556/410; 556/431
(58) Field of Search ................ 528/43, 34, 32, 528/35; 525/477; 585/416; 556/410, 431

(56) References Cited

U.S. PATENT DOCUMENTS

| | | | |
|---|---|---|---|
| 5,346,980 A | 9/1994 | Babu | 528/40 |
| 5,563,181 A | 10/1996 | Keller et al. | 522/99 |
| H1612 H | 11/1996 | Rhein et al. | 528/34 |
| 5,578,380 A | 11/1996 | Babu | 428/447 |
| 5,874,514 A | 5/1999 | Keller et al. | 528/25 |

FOREIGN PATENT DOCUMENTS

WO 93/21278 * 10/1993

* cited by examiner

Primary Examiner—Robert Dawson
Assistant Examiner—Kuo-Liang Peng
(74) Attorney, Agent, or Firm—John J. Karasek; Jane Barrow

(57) ABSTRACT

A linear polymer has repeating units represented by the formula

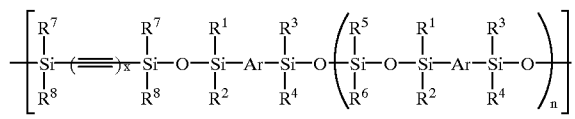

wherein
(a) n is an integer greater than or equal to 0,
(b) x is an integer greater than or equal to 1, and

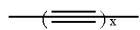

represents an unconjugated acetylenic group when x is equal to 1 or conjugated acetylenic groups when x is greater than 1;
(c) Ar is an aromatic group, and
(c) $R^1$, $R^2$, $R^3$, $R^4$, $R^5$, $R^6$, $R^7$ and $R^8$ are independently selected from the group consisting of alkyl, aryl, alkylaryl, haloalkyl, haloaryl and mixtures thereof. The linear polymer may be thermally cured to form a crosslinked polymer.

17 Claims, No Drawings

HIGH TEMPERATURE ELASTOMERS FROM LINEAR POLY(SILARYLENE-SILOXANE-ACETYLENE)

BACKGROUND OF THE INVENTION

1. Field of the Invention

The invention relates generally to linear polymers that can be cured to form high temperature elastomers and plastics, and in particular to a high temperature elastomer made by curing linear poly(silarylene-siloxane-acetylene).

2. Description of the Related Art

The aerospace industry has a continuing demand for high performance materials that can withstand extreme variations of temperatures. In particular, there is a need for materials that have elastomeric properties, that have thermal, thermo-oxidative and hydrolytic stability at high temperatures (as high as 300–350° C.) and that maintain their flexibility below ambient temperatures. For example, fuel tanks of high flying airplanes and space vehicles require sealants that maintain elasticity for up to 10,000 hours of use at temperatures that range from −60° C. to 400° C. Further, the material must resist swelling when coming into contact with jet fuel and must have excellent adhesion to and inertness toward metallic substrates.

Linear polymers and crosslinked polymers that have repeating units made up of diacetylene groups and siloxane groups are disclosed in, for example, U.S. Pat. No. 5,563,181 to Keller et al and U.S. Pat. No. 5,874,514 to Keller et al, both incorporated herein by reference.

Linear polymers and crosslinked polymers and copolymers made up of silarylene and siloxane units are disclosed in, for example, U.S. Pat. No. 5,578,380 to Babu, U.S. SIR No. H1612 to Rhein et al, and U.S. Pat. No. 5,346,980 to Babu, all incorporated herein by reference.

SUMMARY OF THE INVENTION

It is therefore an object of the present invention to provide a linear polymer that can be crosslinked to form a polymer that has elastomeric properties, that is thermally and oxidatively stable at high temperatures and that maintains its elastomeric properties at low temperatures.

Another object of the present invention is to provide a crosslinked polymer that has elastomeric properties.

Another object of the present invention is to provide a crosslinked polymer that is thermally and oxidatively stable at temperatures as high as 300–350° C.

Another object of the present invention is to provide a crosslinked polymer that maintains its elastomeric properties at temperatures as low as −50° C.

Another object of the present invention is to provide a linear polymer made by a method of synthesis wherein the mechanical properties of the linear polymer and of a crosslinked polymer obtained from curing the linear polymer can be controlled.

These and other objects are obtained by a linear polymer that has repeating units represented by the formula

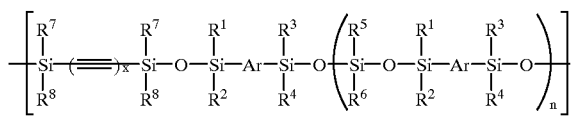

wherein (a) n is an integer greater than or equal to 0,
(b) x is an integer greater than or equal to 1, and

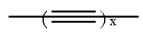

represents an unconjugated acetylenic group when x is equal to 1 or conjugated acetylenic groups when x is greater than 1;
(c) Ar is an aromatic group, and
(c) $R^1$, $R^2$, $R^3$, $R^4$, $R^5$, $R^6$, $R^7$ and $R^8$ are independently selected from the group consisting of alkyl, aryl, alkylaryl, haloalkyl, haloaryl and mixtures thereof.

The invention is further directed to crosslinked polymers by curing a linear polymer as described above.

In the linear polymers and crosslinked polymers of the present invention, the acetylenic groups in the backbone of the polymer provide for crosslinking in comparison to polymers that only have silarylene-siloxane groups. The aromatic groups in the backbone of the polymer provide for improved thermal stability and rigidity, in comparison to polymers that only have siloxane and acetylene groups.

DETAILED DESCRIPTION OF THE PREFERRED EMBODIMENT

The following detailed description of the invention is provided to aid those skilled in the art in practicing the present invention. However, the following detailed description of the invention should not be construed to unduly limit the present invention. Variations and modifications in the embodiments discussed may be made by those of ordinary skill in the art without departing from the scope of the present inventive discovery.

The invention relates to a linear inorganic-organic hybrid polymer and a crosslinked polymer derived therefrom. The linear polymer is made up of repeating units represented by the formula

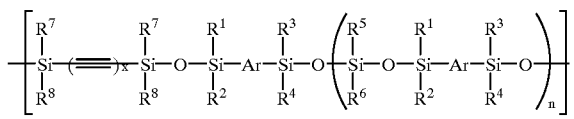

wherein
(a) n is an integer greater than or equal to 0,
(b) x is an integer greater than or equal to 1, and

represents an unconjugated acetylenic group when x is equal to 1 or conjugated acetylenic groups when x is greater than 1;
(c) Ar is an aromatic group, and
(c) $R^1$, $R^2$, $R^3$, $R^4$, $R^5$, $R^6$, $R^7$ and $R^8$ are independently selected from the group consisting of alkyl, aryl, alkylaryl, haloalkyl, haloaryl and mixtures thereof.

Particular values for n and x, particular choices for the side chains $R^1$, $R^2$, $R^3$, $R^4$, $R^5$, $R^6$, $R^7$, $R^8$, and the aromatic group Ar may be selected according to particular properties desired for the linear polymer and for elastomers and plastics made using the compound. For example, increasing the relative number of silarylene and siloxane units (increasing n) increases the chain flexibility. As discussed in more detail below, the relative amount of silarylene-siloxane units and acetylene units in the repeating unit (as represented by the value of n in the formula) can be controlled by selecting the relative molar amounts of reactants in one of the steps of the synthesis of the polymer. Using larger alkyl groups for the side chains $R^1$, $R^2$, $R^3$, $R^4$, $R^5$, $R^6$, $R^7$, $R^8$ increases the solubility of the linear polymer in organic solvents and increases the hydrophobicity and decreases the thermo-oxidative stability of elastomers and plastics made using the compound. Using aryl groups for the side chains $R^1$, $R^2$, $R^3$, $R^4$, $R^5$, $R^6$, $R^7$, $R^8$ increases the stiffness and slightly increases the thermo-oxidative stability of polymers made using the compound. Using larger aryl linking groups for Ar adds stiffness to elastomers and plastics made from the compound. Linear polymers with larger conjugated acetylenic groups (x greater than 2) are more easily cured, but are more expensive to produce.

In the most preferred embodiment, the acetylenic group is butadiyne (x=2), the aromatic group is phenylene, and all the R groups are methyl. The repeating units of this embodiment may thus be represented by the following formula:

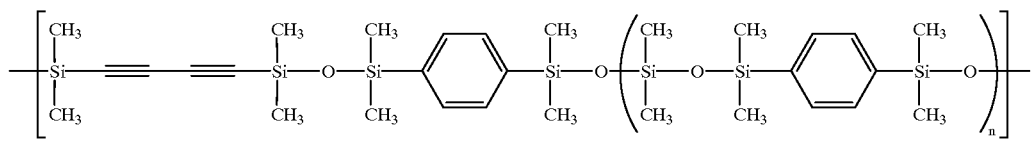

The linear polymer of the present invention has the advantage of being extremely easy to process and convert into elastomers and plastics since it is , depending on the selection of variables and substituents, either a liquid at room temperature or a low melting solid and is soluble in most organic solvents. The linear polymer is thus well-suited to serve as a thermoset polymeric precursor.

The linear polymer may be easily produced by the method exemplified in the following reaction scheme, which illustrates the synthesis of the most preferred embodiment, compound 1, wherein the acetylenic group is butadiyne (x=2), the aromatic group is phenylene, and all the R groups are methyl. The synthesis may be carried out in a one pot, two step reaction. Hexachlorobutadiene, 2, is reacted with four equivalents of n-butyllithium to get 1,4-dilithio-1,3-butadiyne, 3. Dimethylaminochlorodimethylsilane, 4, is added to the solution to get 1,4-bis(dimethylamino-dimethylsilyl)butadiyne, 5.

Meanwhile, compound 6 is formed by reacting an excess amount of 1,4-bis(hydroxydimethylsilyl)benzene, 7, (weak acid) with bis(dimethylamino)dimethylsilane 8 in as refluxing toluene. Despite the relative stability of Si—N bonds, they are readily cleaved by acids and various organic and inorganic nucleophiles and/or electrophiles.

Compound 1, the linear polymer, is produced by reacting compound 5 and compound 6.

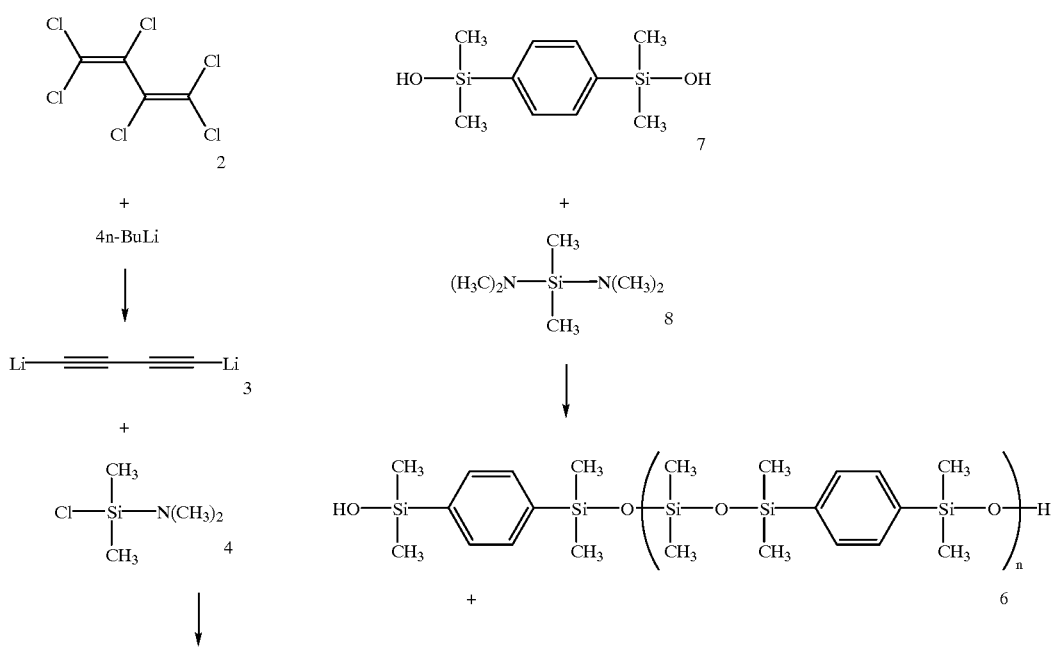

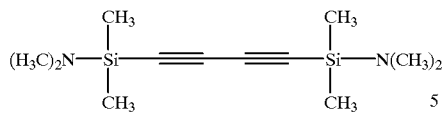

↓

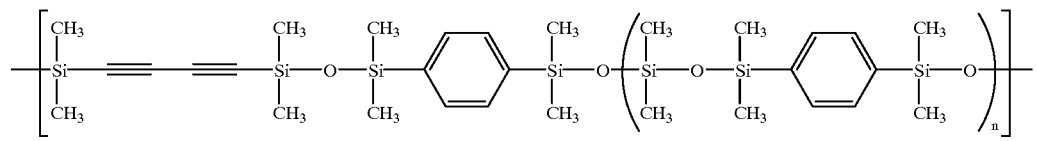

1

Different linear polymers represented by compound 1 may be created by varying the relative amount of compound 7 and compound 8 used in the creation of compound 6 (thereby changing the value of n, which represents the length of the aromatic disiloxyl/trisiloxy group in compounds 1 and 6). In this manner, linear polymers having different properties and processing parameters tailored to specific needs can be easily created.

The crosslinked polymer is made by thermally curing the linear polymer 1. Typically, the curing is carried out for a sufficient time and at a sufficient temperature to allow at least some of the acetylene groups of the linear polymer to react intermolecularly with each other to form a crosslinked network.

EXAMPLES

Having described the invention, the following examples are given to illustrate specific applications of the invention including the best mode now known to perform the invention. These specific examples are not intended to limit the scope of the invention described in this application.

Example #1

Synthesis of 1,4-Bis(Dimethylaminodimethylsilyl)butadiyne

A flame dried 250 ml Schlenk flask containing TBF (20 ml) was cooled to −78° C. and n-butyl lithium (20 ml of 2.4 M in hexane, 48.0 mmol) was added by syringe. After several minutes hexachlorobutadiene (1.88 ml, 12.0 mmol) was added dropwise via syringe over a 10 minute period. After completion of addition, the cold bath was removed and the mixture stirred at room temperature for 3 hours. The resulting 1,4-dilithio-1,3-butadiyne was used without further purification. The flask was then recooled to −78° C., and dimethylaminodimethylchlorosilane (3.6 ml, 24 mmol) was added by syringe. The flask was removed from the cold bath and the reaction mixture stirred at room temperature for 16 hours. At this time $^1$H NMR analysis indicated complete disappearance of dimethylaminodimethylchlorosilane and formation of 1,4-bis(dimethylaminodimethylsilyl)-butadiyne. The TBF was removed in vacuo, and the mixture was taken up in a minimum amount of pentane and filtered. The pentane was removed in vacuo to give 2.91 g (96%) of 1,4-bis(dimethylaminodimethylsilyl)butadiyne.

Example #2
Synthesis of Silarylene-Siloxane Prepolymer Terminated by Hydroxyl Moieties, where n=1

A three-necked flask was equipped with a stir bar, reflux condenser, inlet and outlet adapters for argon gas. The entire assembly was flame dried. 1,4-Bis(hydroxydimethylsilyl)benzene (5.20 g, 23 mmol) was added and toluene (15 ml) was injected by syringe followed by the addition of bis (dimethylamino)dimethylsilane (2.07 ml, 11.5 mmol). The resulting solution was brought to reflux temperature and maintained until there was no further evidence of dimethylamine evolution, as determined by a moist litmus paper test on the exhaust stream of the argon outlet. The reaction mixture was refluxed an additional hour. $^1$H NMR analysis showed complete disappearance of the starting materials and formation of the silarylene-siloxane prepolymer. The prepolymer was used as prepared and then chain extended with 1,4-bis(dimethylaminodimethylsilyl)butadiyne (see example #6).

Example #3
Synthesis of Silarylene-Siloxane Prepolymer Terminated by Hydroxyl Moieties, where n=2

A three-necked flask was equipped with a stir bar, reflux condenser, inlet and outlet adapters for argon gas. The entire assembly was flame dried. 1,4-Bis(hydroxydimethylsilyl)benzene (5.65 g, 24.9 mmol) was added and toluene (15 ml) was injected by syringe followed by the addition of bis (dimethylamino)dimethylsilane (3.00 ml, 16.6 mmol). The resulting solution was brought to reflux temperature and maintained until there was no further evidence of dimethylamine evolution, as determined by a moist litmus paper test on the exhaust stream of the argon outlet. The reaction mixture was refluxed an additional hour. $^1$H NMR analysis showed complete disappearance of the starting materials and formation of the silarylene-siloxane prepolymer. The prepolymer was used as prepared and then chain extended with 1,4-bis(dimethylaminodimethylsilyl)butadiyne (see example #7).

Example #4
Synthesis of Silarylene-Siloxane Prepolymer Terminated by Hydroxyl Moieties, where n=3

A three-necked flask was equipped with a stir bar, reflux condenser, inlet and outlet adapters for argon gas. The entire assembly was flame dried. 1,4-Bis(hydroxydimethylsilyl)benzene (2.66 g, 11.7 mmol) was added and toluene (10 ml) was injected by syringe followed by the addition of bis (dimethylamino)dimethylsilane (1.59 ml, 8.81 mmol). The resulting solution was brought to reflux temperature and maintained until there was no further evidence of dimethylamine evolution, as determined by a moist litmus paper test on the exhaust stream of the argon outlet. The reaction mixture was refluxed an additional hour. $^1$H NMR analysis showed complete disappearance of the starting materials and formation of the silarylene-siloxane prepolymer. The prepolymer was used as prepared and then chain extended with 1,4-bis(dimethylaminodimethylsilyl)butadiyne (see example #8).

Example #5
Synthesis of Linear Poly(Silarylene-Siloxane-Acetylene) where, n=0 as a Precursor to a High Temperature Plastic A three-necked flask was equipped with a stir bar, reflux condenser, inlet and outlet adapters for argon gas. The entire assembly was flame dried. 1,4-Bis(hydroxydimethylsilyl)benzene (2.43 g, 10.7 mmol) was added. A previously prepared sample of 1,4-bis-(dimethylaminodimethylsilyl)butadiyne (2.71 g, 10.7 mmol) was dissolved in 20 ml of toluene. Part of this solution (16 ml) was added to the three-necked flask containing the 1,4-bis(hydroxydimethylsilyl)benzene. The remaining 4 ml was diluted to 20 ml with toluene. After refluxing the reaction mixture for 1 hour, an additional amount of the 1,4-bis(dimethylaminodimethylsilyl)butadiyne solution (4 ml) was added at time intervals of 30 to 60 minutes until dimethylamine evolution had ceased. Toluene was removed at reduced pressure and excess ether was added. The ether solution was washed with a saturated solution of aqueous NH$_4$Cl (2×100 ml). After aqueous workup and extraction with diethyl ether, the polymeric solution was dried over Na$_2$SO$_4$ and filtered. The solvent was removed in vacuo to give 2.71 g, (65%) of the linear poly(silarylene-siloxane-acetylene) as a viscous brown liquid.

Example #6
Synthesis of Linear Poly(Silarylene-Siloxane-Acetylene) where, n=1 as a Precursor to a High Temperature Elastomer To a three-necked flask containing the previously prepared silarylene-siloxane prepolymer terminated by hydroxyl moieties (see example #2) was added a 19.5 ml aliquot of a 20 ml toluene solution containing 1,4-bis(dimethylaminodimethylsilyl)butadiyne(2.91 g, 11.5 mmol). After refluxing the reaction mixture for 1 to 2 hours, an additional amount of the toluene solution containing 1,4-bis(dimethylaminodimethylsilyl)butadiyne (200–500 μl) was added at time intervals of 30 to 60 minutes until the viscosity of the solution visibly increased and dimethylamine evolution had ceased. Toluene was removed at reduced pressure and excess ether was added. The ether solution was washed with a saturated solution of aqueous NH$_4$Cl (2×100 ml). After aqueous workup and extraction with diethyl ether, the polymer solution was dried over Na$_2$SO$_4$ and filtered. The solvent was removed in vacuo to give 4.31 g. (56%), of the linearpoly(silarylene-siloxane-acetylene) as a brown viscous liquid. IR (cm$^{-1}$) 2080 (m), (—C≡C—C≡C—), 1059 (vs, broad), (Si—O). $^1$H NMR (CDCl$_3$, ppm) 7.51 (s), (C$_6$H$_4$), 0.35 (s), 0.30 (s), 0.29 (s), 0.22 (s), 0.03 (s), (Si(CH$_3$)$_2$). $^{13}$C NMR (CDCl$_3$, ppm) 140.8, 140.7, 132.3, 132.25, 132.21, (C$_6$H$_4$), 86.9, 85.4, (—C≡C—C≡C—), 2.09, 1.36, 0.92, 0.74, 0.59, (Si(CH$_3$)$_2$).

Example #7
Synthesis of Linear Poly(Silarylene-Siloxane-Acetylene) where, n=2 as a Precursor to a High Temperature Elastomer To a three-necked flask containing the previously prepared silarylene-siloxane prepolymer terminated by hydroxyl moieties (see example #3) was added a 19.5 mL aliquot of a 20 ml toluene solution containing 1,4-bis(dimethylaminodimethylsilyl)butadiyne (2.10 g, 8.32 mmol). After refluxing the reaction mixture for 1 to 2 hours, an additional amount of the toluene solution containing 1,4-bis(dimethylaminodimethylsilyl)butadiyne (200–500 μl) was added at time intervals of 30 to 60 minutes until the viscosity of the solution visibly increased and dimethylamine evolution had ceased. Toluene was removed at reduced pressure and excess ether was added. The ether solution was washed with a saturated solution of aqueous NH$_4$Cl (2×100 mL). After aqueous workup and extraction with diethyl ether, the polymeric solution was dried over Na$_2$SO$_4$ and filtered. The solvent was removed in vacuo to give 5.84 g, (88%) of the linear poly(silarylene-siloxane-acetylene) as a brown viscous liquid. IR (cm$^{-1}$) 2076 (m), (—C≡C—C≡C—), 1053 (vs, broad), (Si—O). $^1$H NMR (CDCl$_3$, ppm) 7.50 (s), (C$_6$H$_4$), 0.34 (s), 0.27 (s), 0.21 (s), 0.02 (s), (Si(CH$_3$)$_2$). $^{13}$C NMR (CDCl$_3$, ppm) 141.5, 132.9, (C$_6$H$_4$) 86.0, 83.1, (—C≡C—C≡C—), 2.08, 1.52, 1.03, 0.88, 0.67, (Si(CH$_3$)$_2$).

Example #8
Synthesis of Linear Poly(Silarylene-Siloxane-Acetylene) where, n=3 as a Precursor to a High Temperature Elastomer To a three-necked flask containing the previously prepared silarylene-siloxane prepolymer terminated by hydroxyl moieties (see example #4) was added a 4.0 ml aliquot of a 5.0 ml toluene solution containing 1,4-bis(dimethylaminodimethylsilyl)butadiyne (0.83 g, 3.28 mmol). After refluxing the reaction mixture for 1 to 2 hours, an additional amount of the toluene solution containing 1,4-bis(dimethylaminodimethylsilyl)butadiyne (50–100 μl) was added at time intervals of 15 to 30 minutes until the viscosity of the solution visibly increased and dimethylamine evolution had ceased. Toluene was removed at reduced pressure and excess ether was added. The ether solution was washed with a saturated solution of aqueous NH$_4$Cl (2×100 ml). After aqueous workup and extraction with diethyl ether, the polymeric solution was dried over Na$_2$SO$_4$ and filtered. The solvent was removed in vacuo to give 2.45 g, (67%) of the linear poly(silarylene-siloxane-acetylene) as a brown viscous liquid. IR (cm$^{-1}$) 2074 (w), (—C≡C—C≡C—), 1052 (vs, broad), (Si—O). $^1$H NMR (CDCl$_3$, ppm) 7.50 (s), (C$_6$H$_4$), 0.35 (s), 0.30 (s), 0.28 (s), 0.22 (s), 0.02 (s), (Si(CH$_3$)$_2$). $^{13}$C NMR (CDCl$_3$, ppm)140.7, 140.2, 132.2, (C$_6$H$_4$) 86.9, 85.3, (—C≡C—C≡C—), 2.11, 1.40, 0.96, 0.77, (Si(CH$_3$)$_2$).

Example #9
Thermal Curing of the Plastic Precursor: Linear Poly(Silarylene-Siloxane-Acetylene) where n=0 (See Example #5 for Synthesis)

To a platinum thermogravimetric analyzer pan was placed 28.7410 mg of the linear poly(silarylene-siloxane-acetylene). The sample was then heated under an atmosphere of dry nitrogen at 150, 200, 350 and 450° C. for 60, 60, 120 and 120 minutes, respectively. After completion of the isothermal curing experiment the sample was void free and exhibited the characteristics of a plastic material.

Example #10
Post Cure Thermo-Oxidative Stability Study on Crosslinked Poly(Silarylene-Siloxane-Acetylene) where n=0 (See Example #5 for Synthesis and Example #9 for Curing)

Following the isothermal curing cycle performed on the linear poly(silarylene-siloxane-acetylene), the sample was allowed to cool to ambient temperature. The sample was then isothermed on a thermogravimetric analyzer for 120 minutes at 200, 250, 300, and 350° C., respectively, in an air atmosphere at a flow of 50 cc/min. The plastic sample exhibited excellent oxidative stability over the time frame of the experiment, experiencing only a 0.17% weight loss, as determined by thermogravimetric analysis.

Example #11
Bulk Thermal Curing of the Plastic Precursor: Linear Poly (Silarylene-Siloxane-Acetylene) where n=0 (See Example #5 for Synthesis)

To a circular aluminum pan pretreated with a teflon mold release was weighed 1.2015 g of the linear poly(silarylene-siloxane-acetylene). In order to remove any volatile material, the sample was placed on a hot plate and isothermed at 125° C. under dynamic vacuum conditions. Following the degassing procedure, the sample was placed in a tube furnace and heated sequentially under an atmosphere of dry argon for 120 minutes at 200, 250, 300 and 350° C., respectively. After completion of the isothermal curing cycle, the liquid linear poly(silarylene-siloxane-acetylene) had been transformed to a void free, hard plastic material.

Example #12
Thermal Curing of the Elastomeric Precursor: Linear Poly (Silarylene-Siloxane-Acetylene) where n=1 (See Example #6 for Synthesis)

To a platinum thermogravimetric analyzer pan was placed 53.6410 mg of the liquid linear poly(silarylene-siloxane-acetylene). The sample was then converted to an elastomer by heating sequentially under an atmosphere of dry nitrogen for 120 minutes at 200, 250, 300, 350 and 400° C., respectively. After completion of the isothermal curing experiment, the sample was void free and exhibited the characteristics of an elastomeric material, i.e., soft and flexible.

Example #13
Post Cure Thermo-Oxidative Stability Study on Crosslinked Poly(Silarylene-Siloxane-Acetylene) where n=1 (See Example #6 for Synthesis and Example #12 for Curing)

Following the isothermal curing cycle performed on the elastomeric precursor linear poly(silarylene-siloxane-acetylene), the sample was allowed to cool to ambient temperature. The sample was then isothermed in a thermogravimetric analyzer for 60 minutes at 200 and 250° C. and for 120 minutes at 300 and 330° C., respectively, in an air atmosphere at a flow rate of 50 cc/min. The sample exhibited excellent oxidative stability over the time frame of the experiment, experiencing only a 3.26% weight loss. After completion of the thermo-oxidative study, the sample was visibly void free and still retained flexibility as determined by bending the sample.

Example #14
Bulk Thermal Curing of the Elastomeric Precursor: Linear Poly(Silarylene-Siloxane-Acetylene) where n=1 (See Example #6 for Synthesis)

To a circular aluminum pan pretreated with a teflon mold release was weighed 1.6182 g of the linear poly(silarylene-siloxane-acetylene). In order to remove any volatile material, the sample was placed on a hot plate and isothermed at 125° C. under dynamic vacuum conditions. Following the degassing procedure, the sample was placed in a tube furnace and converted to an elastomer by heating sequentially under an atmosphere of dry argon for 120 minutes at 200, 250, 300 and 350° C., respectively. After completion of the isothermal curing cycle, the liquid linear poly(silarylene-siloxane-acetylene) had been transformed to a tough, void-free, flexible material.

Example #15
Thermal Curing of the Elastomeric Precursor: Linear Poly (Silarylene-Siloxane-Acetylene) where n=2 (See Example #7 for Synthesis)

To a platinum thermogravimetric analyzer pan was placed 28.9990 mg of the liquid linear poly(silarylene-siloxane-acetylene). The sample was then heated sequentially under an atmosphere of dry nitrogen for 120 minutes at 200, 250, 300, 350 and 400° C., respectively. After completion of the isothermal curing experiment, the sample was void free and exhibited the characteristics of an elastomeric material, i.e., soft and flexible.

Example #16
Post Cure Thermo-Oxidative Stability Study on Crosslinked Poly(Silarylene-Siloxane-Acetylene) where n=2 (See Example #7 for Synthesis and Example #15 for Curing)

Following the isothermal curing cycle performed on the liquid precursor linear poly (silarylene-siloxane-acetylene), the elastomeric sample was allowed to cool to ambient temperature. The sample was then isothermed in a thermogravimetric analyzer for 60 minutes at 200 and 250° C. and for 120 minutes at 300 and 330° C., respectively, in an air atmosphere at a flow rate of 50 cc/min. The sample exhibited excellent oxidative stability over the time frame of the experiment, experiencing only a 7.69% weight loss. After completion of the thermo-oxidative study, the sample was visibly void-free and still retained flexibility, as determined by bending the sample.

Example #17
Bulk Thermal Curing of the Elastomeric Precursor: Linear Poly(Silarylene-Siloxane-Acetylene) where n=2 (See Example #7 for Synthesis)

To a circular aluminum pan pretreated with a teflon mold release was weighed 1.6203 g of the liquid linear poly (silarylene-siloxane-acetylene). In order to remove any volatile material, the sample was placed on a hot plate and heated at 125° C. under dynamic vacuum conditions. Following the degassing procedure, the sample was placed in a tube furnace and converted to an elastomer by heating sequentially under an atmosphere of dry argon for 120 minutes at 200, 250, 300 and 350° C., respectively. After completion of the isothermal curing cycle, the liquid linear poly(silarylene-siloxane-acetylene) had been transformed to a tough, void-free, flexible material.

Example #18
Thermal Curing of the Elastomeric Precursor: Linear Poly (Silarylene-Siloxane-Acetylene) where n=3 (See Example #8 for Synthesis)

To a platinum thermogravimetric analyzer pan was placed 41.6950 mg of the liquid linear poly(silarylene-siloxane-acetylene). The sample was then converted to an elastomer by heating sequentially under an atmosphere of dry nitrogen for 120 minutes at 200, 250, 300, 350 and 400° C., respectively. After completion of the isothermal curing experiment, the sample was void-free and exhibited the characteristics of an elastomeric material, i.e., soft and flexible.

Example #19
Post Cure Thermo-Oxidative Stability Study on Crosslinked Poly(Silarylene-Siloxane-Acetylene) where n=3 (See Example #8 for Synthesis and Example #18 for Curing)

Following the isothermal curing cycle performed on the elastomeric precursor linear poly(silarylene-siloxane-acetylene), the sample was allowed to cool to ambient temperature. The elastomeric sample was then isothermed in a thermogravimetric analyzer for 60 minutes at 200 and 250° C. and for 120 minutes at 300 and 330° C., respectively in an air atmosphere at a flow rate of 50 cc/min. The sample exhibited excellent oxidative stability over the time frame of the experiment, experiencing only a 3.96% weight loss. After completion of the thermo-oxidative study, the sample was visibly void-free and still retained flexibility, as determined by bending the sample.

Example #20

Bulk Thermal Curing of the Elastomeric Precursor: Linear Poly(Silarylene-Siloxane-Acetylene) where n=3 (See Example #8 for Synthesis)

To a circular aluminum pan pretreated with a teflon mold release was weighed 1.6053 g of the linear poly(silarylene-siloxane-acetylene). In order to remove any volatile material, the sample was placed on a hot plate and isothermed at 125° C. under dynamic vacuum conditions. Following the degassing procedure, the sample was placed in a tube furnace and converted to an elastomer by heating sequentially under an atmosphere of dry argon for 120 minutes at 200, 250, 300 and 350° C., respectively. After completion of the isothermal curing cycle, the liquid linear poly(silarylene-siloxane-acetylene) had been transformed to a tough, void-free, flexible material.

Obviously, many modifications and variations of the present invention are possible in light of the above teachings. It is therefore to be understood that, within the scope of the appended claims, the invention may be practiced otherwise than as specifically described.

What is claimed is:

1. A linear polymer comprising repeating units represented by the formula

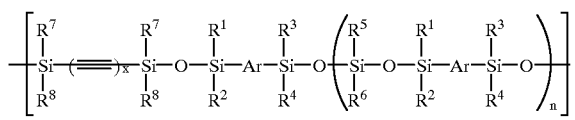

wherein
(a) n is an integer greater than or equal to 0,
(b) x is an integer greater than or equal to 1, and

represents an unconjugated acetylenic group when x is equal to 1 or conjugated acetylenic groups when x is greater than 1;
(c) Ar is an aromatic group, and
(c) $R^1$, $R^2$, $R^3$, $R^4$, $R^5$, $R^6$, $R^7$ and $R^8$ are independently selected from the group consisting of alkyl, aryl, alkylaryl, haloalkyl, haloaryl and mixtures thereof.

2. The linear polymer of claim 1 wherein x is 2.
3. The linear polymer of claim 1 wherein Ar is phenylene.
4. The linear polymer of claim 1 wherein $R^1$, $R^2$, $R^3$, $R^4$, $R^5$, $R^6$, $R^7$ and $R^8$ are $CH_3$.

5. The linear polymer of claim 1 wherein n is 0.
6. The linear polymer of claim 1 wherein n is 1.
7. The linear polymer of claim 1 wherein n is 2.
8. The linear polymer of claim 1 wherein n is 3.
9. A linear polymer comprising repeating units represented by the formula

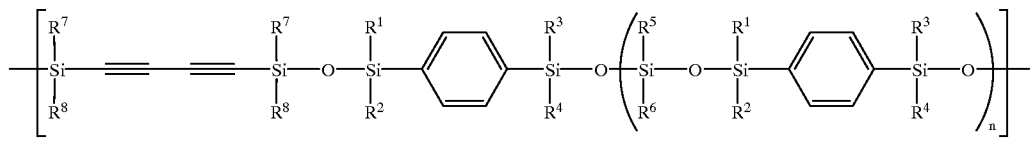

wherein n is an integer greater than or equal to 0, and $R^1$, $R^2$, $R^3$, $R^4$, $R^5$, $R^6$, $R^7$ and $R^8$ are independently selected from the group consisting of alkyl, aryl, alkylaryl, haloalkyl, haloaryl and mixtures thereof.

10. The linear polymer of claim 9 wherein $R^1$, $R^2$, $R^3$, $R^4$, $R^5$, $R^6$, $R^7$ and $R^8$ are $CH_3$.
11. The linear polymer of claim 9 wherein n is 0.
12. The linear polymer of claim 9 wherein n is 1.
13. The linear polymer of claim 9 wherein n is 2.
14. The linear polymer of claim 9 wherein n is 3.
15. A linear polymer made by a process comprising the steps of
(a) reacting hexachlorobutadiene with n-butyl lithium to form 1,4-dilithio-1,3-butadiyne,
(b) reacting the 1,4-dilithio-1,3-butadiyne of step (a) with (dimethylamino)($R^9$-disubstituted)chlorosilane, wherein each $R^9$ is independently selected from the group consisting of alkyl, aryl, alkylaryl, haloalkyl, haloaryl and mixtures thereof, to form 1,4-bis(dimethylamino, $R^9$-disubstituted-silyl)butadiyne,
(c) reacting 1,4-bis(hydroxy-$R^{10}$-disubstituted-silyl)-Ar, wherein Ar is an aromatic group,
wherein $R^{10}$ is independently selected from the group consisting of alkyl, aryl, alkylaryl, haloalkyl, haloaryl and mixtures thereof, with bis(dimethylamino)$R^{11}$-disubstituted-silane,
wherein $R^{11}$ is independently selected from the group consisting of alkyl, aryl, alkylaryl, haloalkyl, haloaryl and mixtures thereof, to form a prepolymer of the formula:

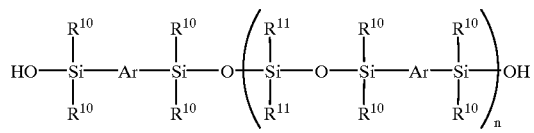

wherein n is an average value greater than or equal to 0, and wherein the value of n is controlled by selecting the initial molar ratio of 1,4-bis(hydroxy-$R^{10}$-disubstituted-silyl)benzene and bis(dimethylamino)$R^{11}$-disubstituted-silane, and
(d) reacting the prepolymer of step (c) with the 1,4-bis(dimethylamino, $R^9$-disubstituted-silyl)butadiyne of step (b) to form the linear polymer.

16. The linear polymer of claim 15 wherein the Ar group is phenylene.
17. A linear polymer made by a process comprising the steps of (a) reacting hexachlorobutatdiene with n-butyl lithium to form 1,4-dilithio-1,3-butadiyne, (b) reacting the 1,4-dilithio-1,3butadiyne of step (a) with (dimethylamino)dimethylchlorosilane to form 1,4-bis(dimethylaminodimethylsilyl)butadiyne, (c) reacting 1,4-bis(hydroxydimethylsilyl)benzene with bis(dimethylamino)dimethylsilane, to form a prepolymer of the formula:

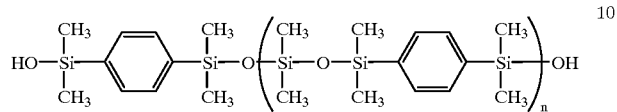

wherein n is an average value greater than or equal to 0, and wherein the value of n is controlled by selecting the initial molar ratio of 1,4-bis(hydroxydimethylsilyl)benzene and bis(dimethylamino)dimethylsilane, and (d) reacting the prepolymer of step (c) with the 1,4-bis(dimethylaminodimethylsilyl)butadiyne of step (b) to form the linear polymer.

* * * * *